E. A. COLLIN.
HORSE DETACHER.
APPLICATION FILED MAY 4, 1908.

905,288.

Patented Dec. 1, 1908.

2 SHEETS—SHEET 1.

Witnesses
C. E. Smith.
N. J. Keim.

Inventor
E. A. Collin,
By Beeler & Robb
Attorneys

E. A. COLLIN.
HORSE DETACHER.
APPLICATION FILED MAY 4, 1908.

905,288.

Patented Dec. 1, 1908.
2 SHEETS—SHEET 2.

Witnesses
C. E. Smith.
N. J. Keim.

Inventor
E. A. Collin,
By Beeler & Robb
Attorneys

UNITED STATES PATENT OFFICE.

ERIK A. COLLIN, OF TURNER, NEBRASKA.

HORSE-DETACHER.

No. 905,288.  Specification of Letters Patent.  Patented Dec. 1, 1908.

Application filed May 4, 1908. Serial No. 430,729.

*To all whom it may concern:*

Be it known that I, ERIK A. COLLIN, a citizen of the United States, residing at Turner, in the county of Holt and State of Nebraska, have invented certain new and useful Improvements in Horse-Detachers, of which the following is a specification.

This invention relates to that class of devices which are intended to provide for quick release of a horse or horses from a vehicle. It is not infrequent that serious accidents occur to occupants of vehicles due to runaways, and it is for the reason that the horses cannot be set free so as to enable the vehicles to come to rest.

Figure 1:
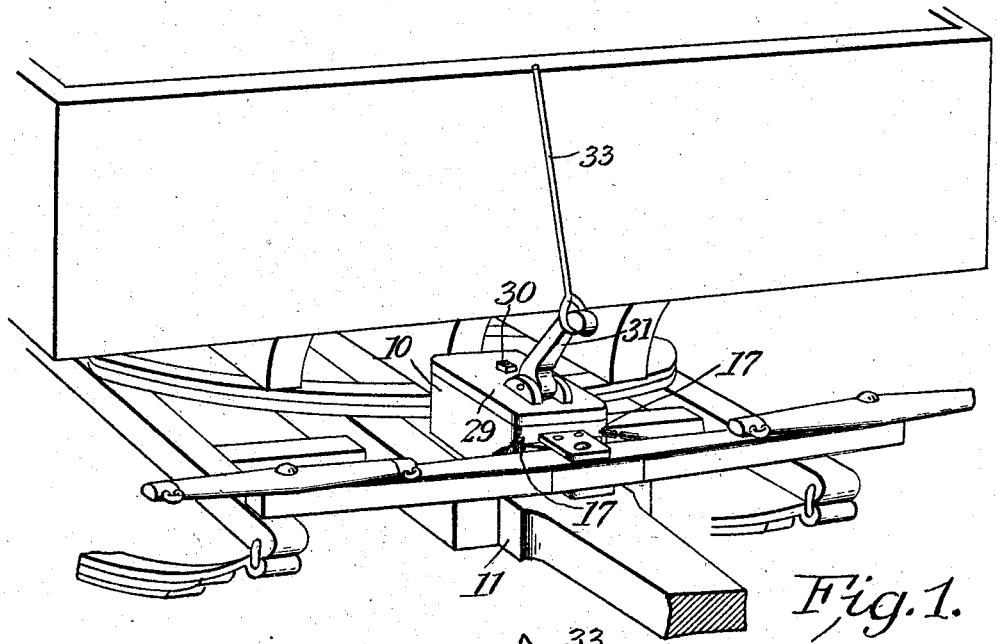
Figure 2:
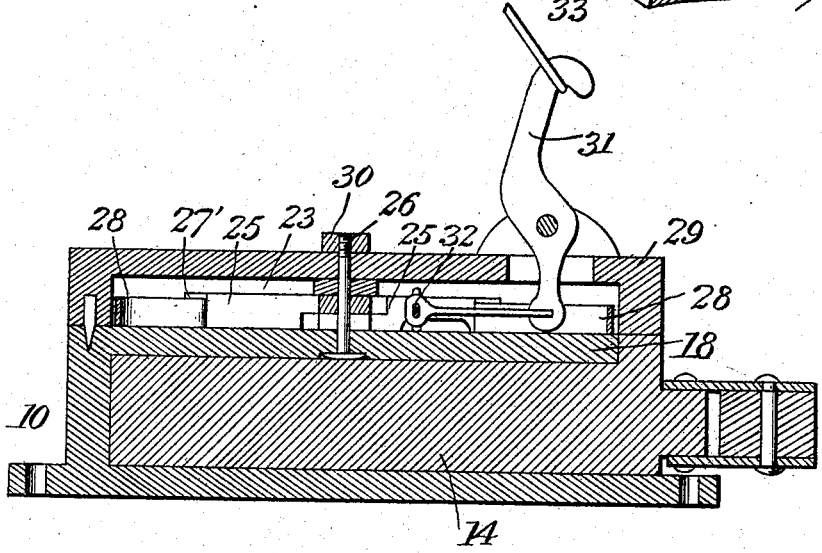
Figure 3:
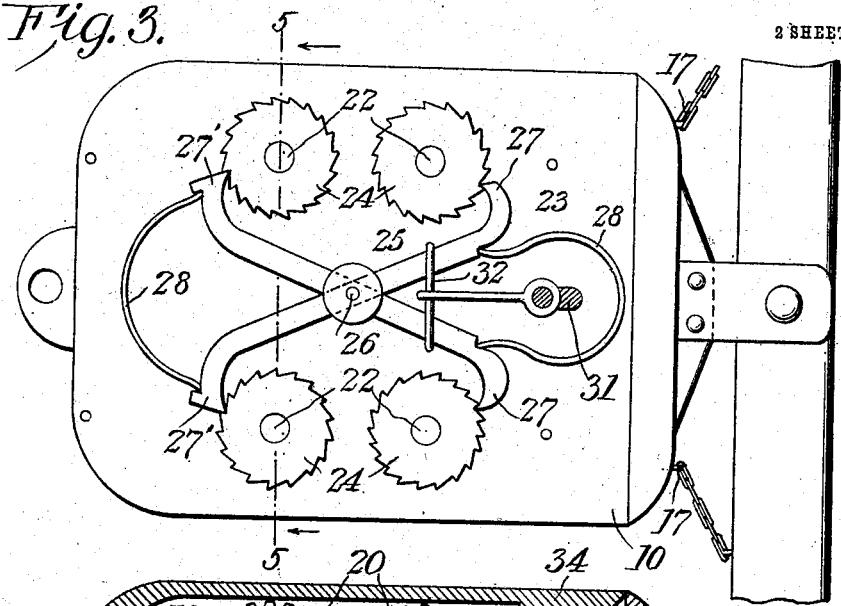
Figure 4:
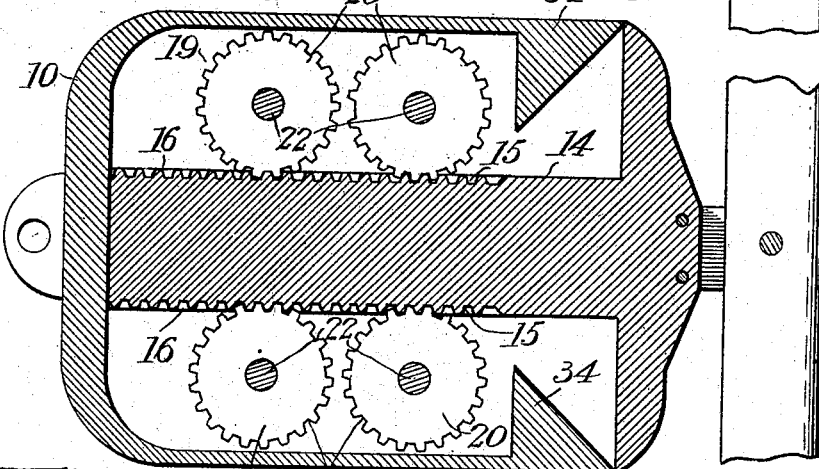
Figure 5:
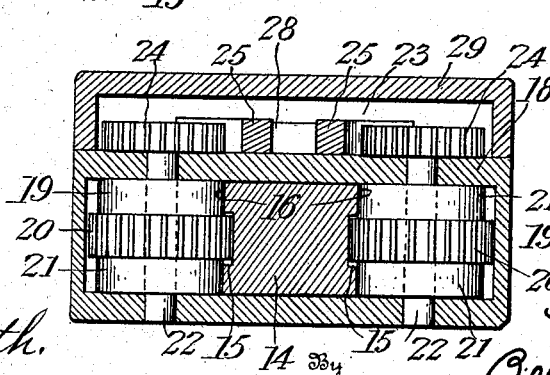

For a full understanding of the invention, including its mode of application and operation, reference is to be had to the following detail description and the accompanying drawings, in which Figure 1 is a general perspective indicating the invention applied; Fig. 2 is a central longitudinal section; Fig. 3 is a plan view, portions being removed; Fig. 4 is a horizontal section, and Fig. 5 is a vertical transverse section on the line 5—5 of Fig. 3.

Throughout the following description and on the several figures of the drawings, similar parts are referred to by corresponding reference characters.

As a practical embodiment of this invention, the same comprises a casing 10 adapted to be permanently secured to a vehicle pole 11. It will be understood, however, that a similar structure may be attached to the cross bar of a pair of buggy shafts for the purpose of accommodating the attachment of one horse. As indicated herein the usual double tree is pivotally connected to the front end of a block or cross head, the body of which projects rearwardly within the casing 10. The rear end 14 of said cross head is provided with a series of rack teeth 15 on each side extending substantially throughout its length. On each side of said rack, above and below the same, is a smooth bearing surface 16. The cross head may be provided at each side in front with eyelets 17 for the purpose of attaching stay chains if desired.

As shown in the drawings the casing 10 is provided with a longitudinal and transverse partition 18 spaced from the bottom and parallel therewith and between which and the bottom the aforesaid cross head operates. Journaled within the casing are a plurality of guiding devices 19, each of said devices consisting of a pinion 20 adapted to coöperate with the rack 15 and a plurality of rollers 21 to coöperate with the bearing surfaces 16. The shaft 22 for each guiding device 19 is journaled in the aforesaid partition and in the bottom of the casing, and except as hereinafter noted, is free to rotate in its bearings. As herein shown there are four of said guiding devices 19, but it is to be understood that this number may be varied as occasion may dictate.

Suitably located, as above the partition 18, is a locking means 23 for the aforesaid rotary guiding devices. Secured to the upper end of each shaft 22 is a ratchet wheel 24. A plurality of pawls are adapted to coöperate with said ratchet wheels for the purpose of locking the same and the guiding devices from rotation whereby the cross head is prevented from abnormal withdrawal from the casing. The pawls consist of two members 25 mounted upon a central stud 26, and each of said members has at its forward end a pawl 27 and its rear end a pawl 27'. One or more springs 28 coöperate with said pawl members to cause the same to engage the aforesaid ratchet wheels 24. The stud 26 is located in the partition 18 and extends into and through a cover plate 29 which incloses the said locking means. A nut 30 on the upper end of the stud constitutes a part of the means for securing the cover plate in position. Extending through the cover plate and journaled on a transverse pivot therein is an operating lever 31 having a connection at its lower end by means of a yoke 32 with the aforesaid pawl members 25. Upon operation of the lever rearwardly as when drawn upon by a suitable cord or rod 33 by an occupant of the vehicle the lower or inclosed end of the lever will draw the yoke forwardly causing the pawls 27 to approach each other, and likewise the pawls 27', all of the pawls thereby being withdrawn from the ratchet wheels 24, setting said ratchet wheels and guiding devices free for rotation and consequently allowing the cross head to be withdrawn from the casing.

Upon recovery of the cross head the same may be replaced in the casing for further use. The mouth of the casing is provided with beveled guides 34 to facilitate the entrance of the cross head therein.

The device herein described may be made of any suitable material and of any desired proportions. It is to be understood also that slight modifications in structure may be resorted to without departing from the spirit of the invention hereinafter claimed.

Having thus described the invention, what is claimed as new, is:

1. In a horse detacher for vehicles, the combination of a casing, a cross head having a rack projecting into said casing, draft means secured to said cross head, guiding devices journaled in said casing for coöperation with said rack, locking means for said guiding devices including ratchet wheels secured to the upper ends of said guiding devices, and pawls coöperating with said ratchet wheels, substantially as set forth.

2. In a device of the character set forth, the combination with a vehicle, of a horse detacher comprising a casing adapted to be secured to said vehicle, a cross head having a rack projecting within the casing, guiding devices journaled in the casing and coöperating with said rack and each consisting of a shaft, a pinion, and rollers mounted on said shaft, locking means for said guiding devices comprising a ratchet wheel for each of said shafts, a set of pawls engaging said ratchet wheels, and means within reach of an occupant of the vehicle for releasing said pawls from the ratchet wheels.

3. In combination with a vehicle, a casing adapted to be secured thereto, a cross head extending within the casing, draft means secured to said cross head, guiding devices journaled in the casing and including means for holding said cross head, locking means coöperating with said guiding devices to prevent rotation thereof, said locking means including ratchets and pawl members pivoted on a single pivot, a yoke embracing said members, and a lever pivoted in said casing and connected to said yoke for the purpose of releasing the pawls from the ratchets.

In testimony whereof I affix my signature in presence of two witnesses.

ERIK A. COLLIN.

Witnesses:
 L. G. KLOKE,
 OSCAR W. MUNSON.